United States Patent
Sonksen et al.

(10) Patent No.: US 7,681,102 B2
(45) Date of Patent: Mar. 16, 2010

(54) BYTE LEVEL PROTECTION IN PCI-EXPRESS DEVICES

(75) Inventors: Bradley S. Sonksen, Margarita, CA (US); Vi Chau, Laguna Niguel, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 855 days.

(21) Appl. No.: 11/396,748

(22) Filed: Apr. 3, 2006

(65) Prior Publication Data

US 2007/0234173 A1    Oct. 4, 2007

(51) Int. Cl.
    *H03M 13/00* (2006.01)
(52) U.S. Cl. .............................. 714/752; 714/6; 714/768
(58) Field of Classification Search .................. 714/752
    See application file for complete search history.

(56) References Cited

U.S. PATENT DOCUMENTS

| | | | | |
|---|---|---|---|---|
| 5,477,551 A | * | 12/1995 | Parks et al. | 714/758 |
| 5,588,112 A | * | 12/1996 | Dearth et al. | 714/9 |
| 5,771,356 A | * | 6/1998 | Leger et al. | 709/233 |
| 6,021,450 A | * | 2/2000 | Yoshizawa et al. | 710/305 |
| 6,460,157 B1 | * | 10/2002 | Chen et al. | 714/758 |
| 2004/0114454 A1 | * | 6/2004 | Farmwald et al. | 365/233 |

* cited by examiner

*Primary Examiner*—M. Mujtaba K Chaudry
*Assistant Examiner*—Enam Ahmed
(74) *Attorney, Agent, or Firm*—Klein, O'Neill & Singh, LLP

(57) ABSTRACT

Method and system for protecting data in a PCI-Express device is provided. The method includes adding error correction code (ECC) to every byte of data that enters a PCI-Express Transaction Handler ("PTH") Module and is destined for a host system memory or destined to another device, before the data is aligned within the PTH module; verifying the ECC code for every byte of the data before the data leaves the PTH module; and generating the ECC code for a data block size, wherein the data block size depends on the destination of the data.

21 Claims, 9 Drawing Sheets

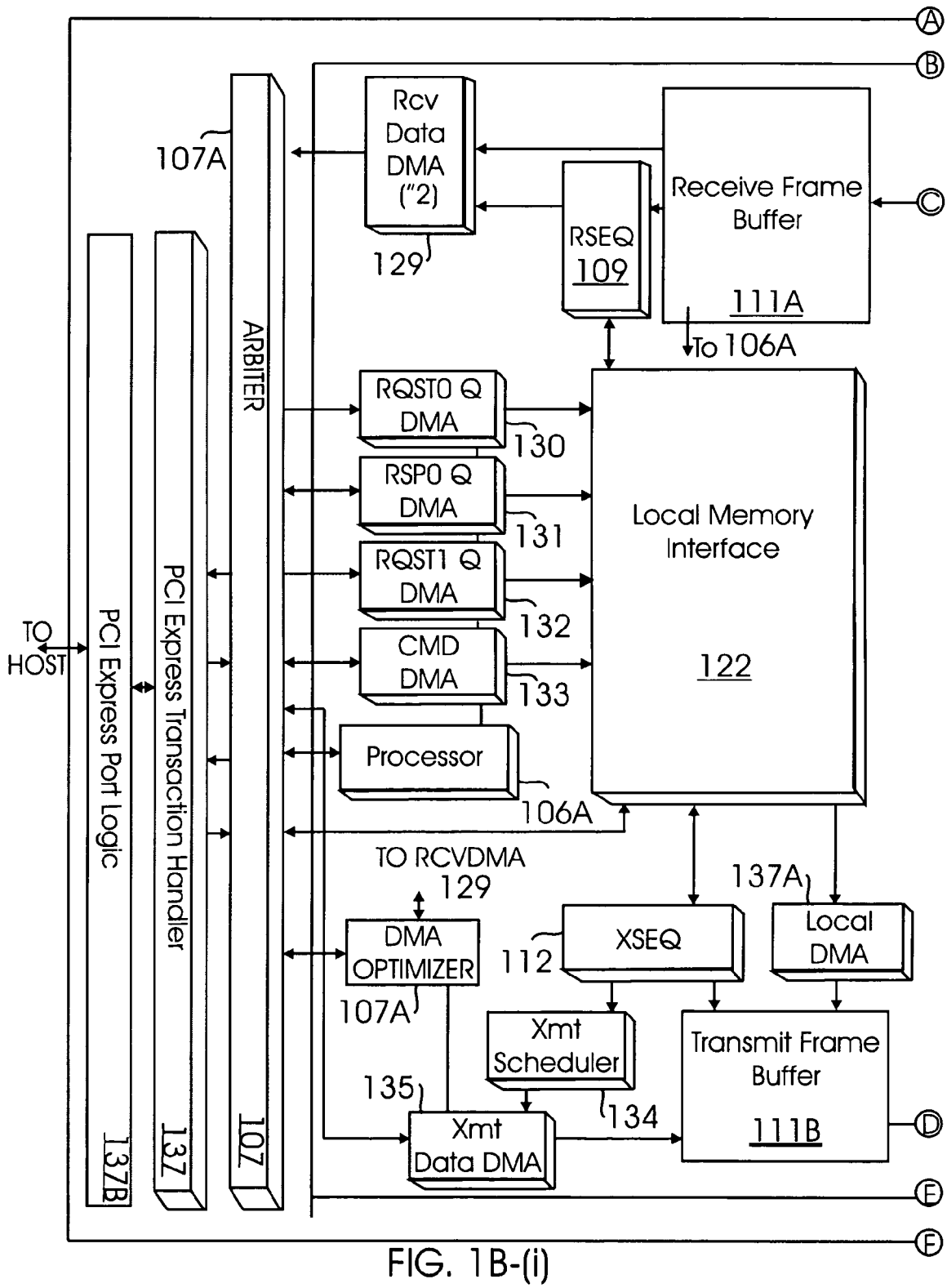
FIG. 1B-(i)

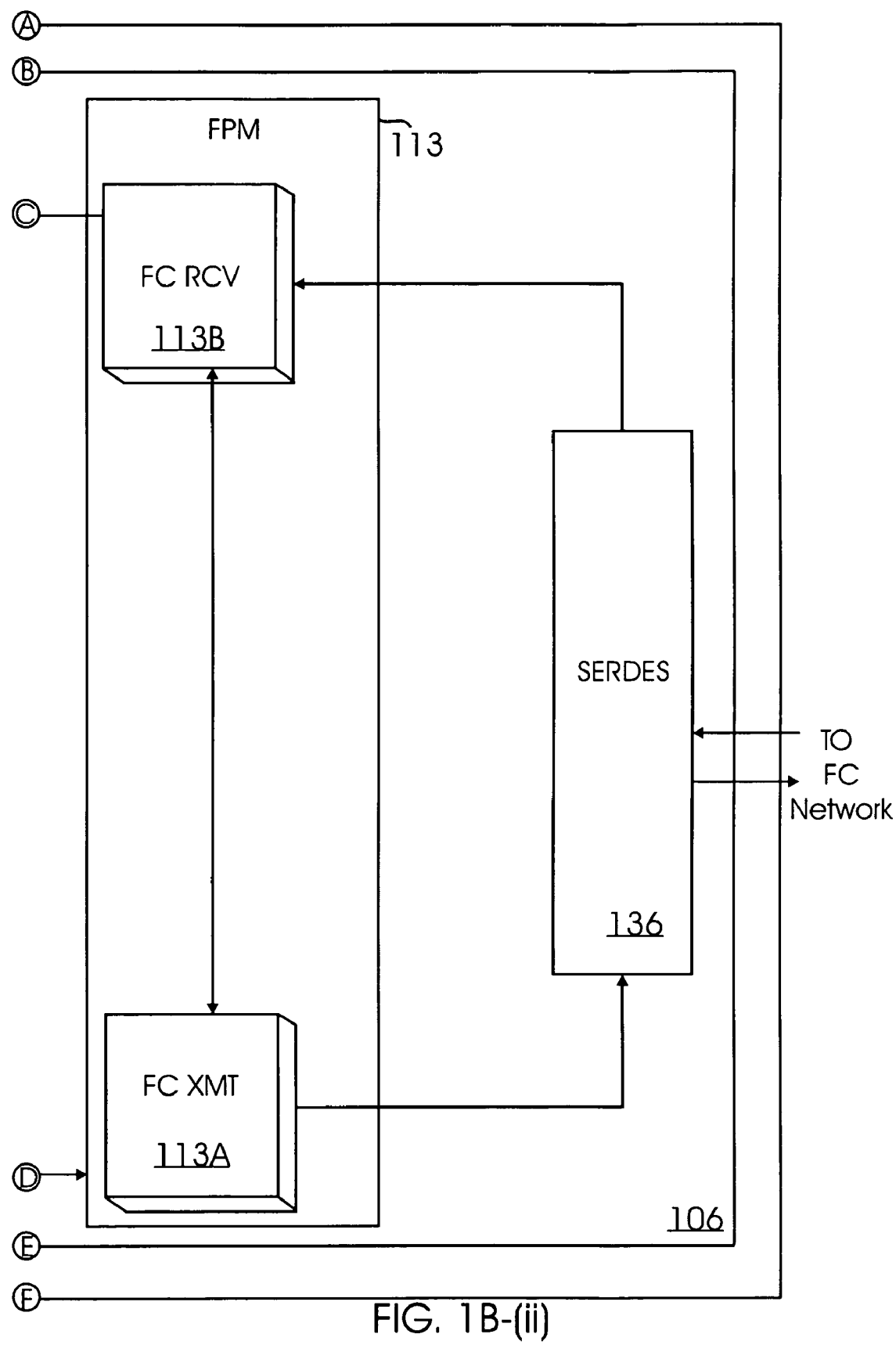
FIG. 1B-(ii)

BYTE LEVEL PROTECTION IN PCI-EXPRESS DEVICES

BACKGROUND

1. Field of the Invention

The present invention relates to computing systems, and more particularly to maintaining data integrity in PCI-Express devices.

2. Background of the Invention

Conventional computing systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host systems are used in various network applications, including storage area networks ("SANs"). In SANs, plural memory storage devices are made available to various host computing systems. Data in a SAN is typically moved between plural host systems and storage systems (or storage devices, used interchangeably throughout this specification) through various controllers/adapters. Host systems often communicate with storage systems via a host bus adapter ("HBA", may also be referred to as a "controller" and/or "adapter").

Host systems often communicate with peripheral devices via an interface such as the Peripheral Component Interconnect ("PCI") interface, a local bus standard that uses parallel data transfer, or the extension of PCI known as PCI-X. Both the PCI and PCI-X standard specifications are incorporated herein by reference in their entirety.

More recently, PCI-Express, a standard interface incorporating PCI transaction protocols at the logical level, but using serial data transfer at the physical level has been developed to offer better performance than PCI or PCI-X. PCI-Express is an Input/Output ("I/O") bus standard (incorporated herein by reference in its entirety) that is compatible with existing PCI cards using the PCI Express bus.

HBAs (a PCI-Express device) that are placed in SANs, receive serial data streams (bit stream), align the serial data and then convert it into parallel data for processing. HBAs operate as a transmitting device as well as a receiving device.

When data is moved from host system memory to storage systems and vice-versa, it needs to be protected. This is because memory in electronic devices has the potential to return incorrect information. There are two types of errors, "hard" and "soft". A hard error may occur when a bit may be stuck so that it always returns "0". A soft error occurs when a bit reads back wrong information once and then functions properly. Soft errors are more difficult to detect versus hard errors.

Data can be protected using parity and error correction code ("ECC"). Parity checking is a rudimentary way of checking single bit errors. Parity adds a bit of data to every 8-bits (or other sizes) of data. When parity checking is enabled, a logic circuit called a parity generator/checker examines every byte of data and determines whether the data byte has an even or an odd number of ones. If it has odd number of ones, the ninth bit is set to one; otherwise it is set to zero. When data is read, the parity circuit operates as a checker and determines if there are odd or even number of ones to determine if there is a bit-error. Parity checking provides single-bit error detection, but does not handle multi-bit errors, and does not correct errors.

ECC is used to detect single/multiple bit errors and corrects errors. A special algorithm (for example, SECDED (Single Error Correction with Double Error Detection) algorithm) is used to encode information in a block of bits that contains enough detail to permit recovery of a single bit error in the protected data. ECC typically uses 8 bits of code to protect 64 bits of data.

HBAs operating in networks use ECC to protect data when data is moved from host system memory to HBA memory and then sent to a storage system (i.e. in the transmit path). ECC is also used to protect data when it is received from a storage system and sent to host system memory via the HBA (receive path).

Often data has to be aligned, padded and/or shortened (by removing padding) at the HBA level when data is being moved through a data path in the HBA. ECC has to be generated/re-generated depending on how data is being aligned and handled. This requires ECC data to be checked and re-generated for each re-alignment option at each transition in transmit/receive data paths. As the number of re-alignments increase, the number of gates required to re-generate and check ECC increases. This increases cost and complexity and is hence undesirable.

Therefore, there is a need for a method and system that can efficiently generate and verify ECC in an environment where data is aligned/re-aligned.

SUMMARY OF THE INVENTION

In one aspect of the present invention, a method for protecting data in a PCI-Express device is provided. The method includes adding error correction code (ECC) to every byte of data that enters a PCI-Express Transaction Handler ("PTH") Module and is destined for a host system memory or destined to another device, before data is aligned within the PTH module; verifying ECC code for every byte of data before data leaves the PTH module; and generating ECC code for a data block size, wherein the data block size depends on the destination of the data.

In another aspect of the present inventions, a PCI-Express device coupled to a host system via a PCI Express bus and to another device via a network connection is provided. The PCI-Express device includes a PCI-Express Transaction Handler ("PTH") Module that (1) adds error correction code (ECC) to every byte of data that is destined for a host system memory or destined to another device, before data is aligned within the PTH module, (2) verifies the ECC code for every byte of the data, and (3) generates the ECC code for a data block size before the data leaves the PTH module, wherein the data block size depends on the destination of the data.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 1B shows a block diagram of a HBA, as an example of a PCI-Express device;

DETAILED DESCRIPTION OF THE PREFERRED EMBODIMENTS

In one aspect of the present invention, data is protected at a byte level by a PCI Express device that has to align/re-align data received from another device and/or sent to another device. This means that every byte (8 bits) of data that is being received from a storage device for a host system or every byte of data that is to be transmitted to another device is protected/verified.

Since ECC data is generated and verified for every byte of data, the complexities involved in generating/re-generating ECC after alignment/re-alignment is minimized. It is noteworthy that the byte level ECC protection is provided when data has to be modified, aligned or re-aligned, otherwise, to improve efficiency, data blocks (where a data block is greater than a byte) are protected by ECC (for example, ECC is used for every 64-bits of data).

To facilitate an understanding of the preferred embodiment, the general architecture and operation of a SAN, and a HBA will be described. The specific architecture and operation of the preferred embodiment will then be described with reference to the general architecture of the host system and HBA.

Figure 1A:
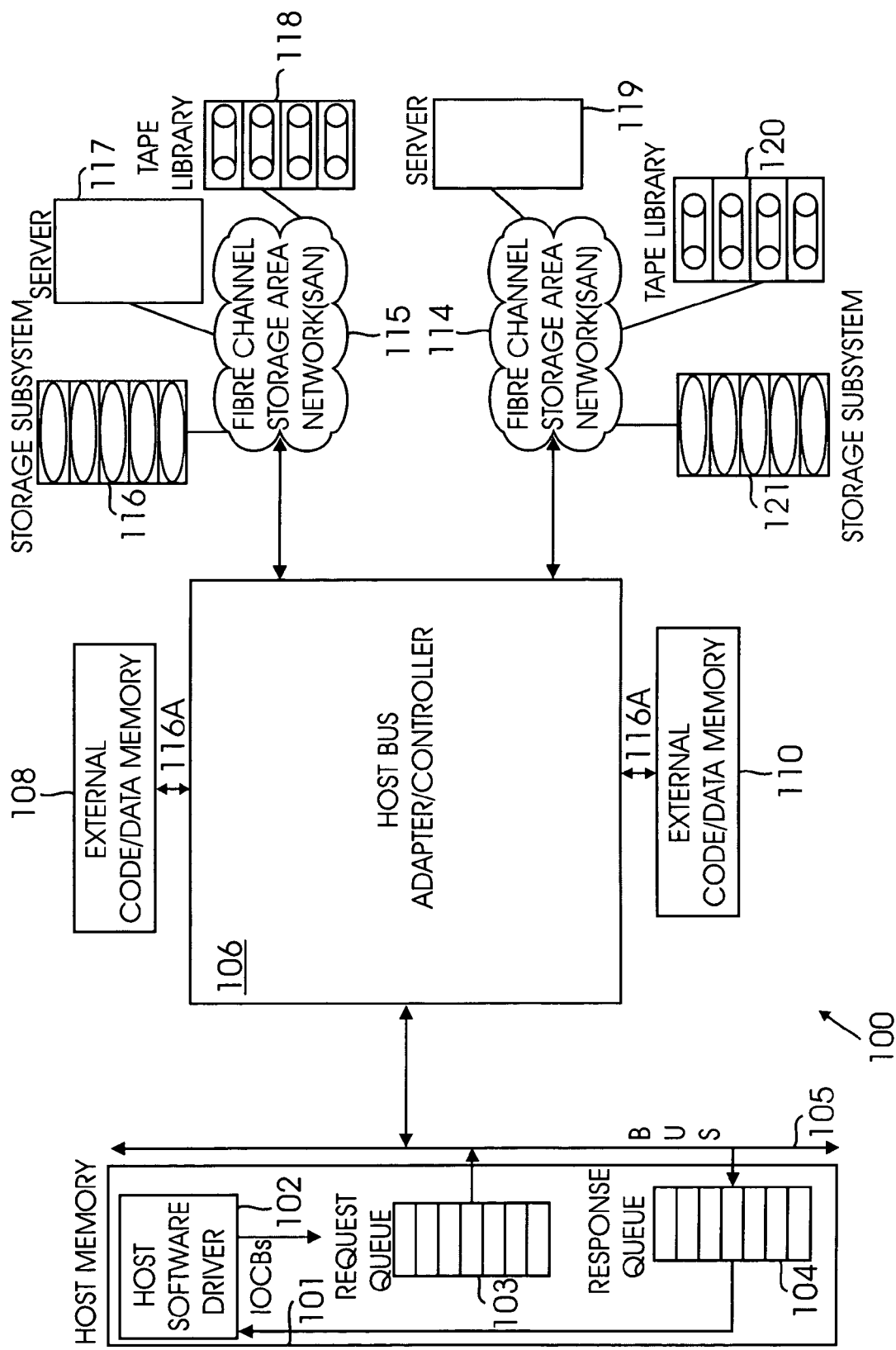
FIG. 1A is a block diagram showing various components of a SAN.

SAN Overview:

FIG. 1A shows a SAN system 100 that uses a HBA 106 (referred to as "adapter 106") for communication between a host system with host memory 101 to various storage systems (for example, storage subsystem 116 and 121, tape library 118 and 120) using fibre channel storage area networks 114 and 115. Host memory 101 includes a driver 102 that co-ordinates all data transfer via adapter 106 using input/output control blocks ("IOCBs"). Servers 117 and 119 can also access the storage sub-systems using SAN 115 and 114, respectively.

A request queue 103 and response queue 104 is maintained in host memory 101 for transferring information using adapter 106. Host system communicates with adapter 106 via a PCI-Express bus 105.

HBA 106:

FIG. 1B shows a block diagram of adapter 106. Adapter 106 includes processors (may also be referred to as "sequencers") "RSEQ" 109 and "XSEQ" 112 for receive and transmit side, respectively, for processing data received from storage sub-systems and transmitting data to storage sub-systems. Transmit path in this context means data path from host memory 101 to the storage systems via adapter 106. Receive path means data path from storage subsystem via adapter 106. It is noteworthy, that only one processor is used for receive and transmit paths, and the present invention is not limited to any particular number/type of processors. Buffers 111A and 111B are used to store information in receive and transmit paths, respectively.

Beside dedicated processors on the receive and transmit path, adapter 106 also includes processor 106A, which may be a reduced instruction set computer ("RISC") for performing various functions in adapter 106.

Adapter 106 also includes fibre channel interface (also referred to as fibre channel protocol manager "FPM") 113 that includes modules 113B and 113A in receive and transmit paths, respectively (shown as "FC RCV" and "FC XMT"). Modules 113B and 113A allow data to move to/from storage systems.

Adapter 106 is also coupled to external memory 108 and 110 via connection 116A (FIG. 1A) (referred interchangeably, hereinafter) and local memory interface 122. Memory interface 122 is provided for managing local memory 108 and 110. Local DMA module 137A is used for gaining access to move data from local memory (108/110). Adapter 106 also includes a serial/de-serializer 136 for converting data from 10-bit to 8-bit format and vice-versa.

Adapter 106 also includes request queue DMA channel (0) 130, response queue DMA channel 131, request queue (1) DMA channel 132 that interface with request queue 103 and response queue 104; and a command DMA channel 133 for managing command information. DMA channels are coupled to arbiter 107 that receives requests and grants access to a certain channel.

Both receive and transmit paths have DMA modules "RCV DATA DMA" 129 and "XMT DATA DMA" 135 that are used to gain access to a channel for data transfer in the receive/transmit paths. Transmit path also has a scheduler 134 that is coupled to processor 112 and schedules transmit operations.

A host processor (not shown) sets up shared data structures in buffer memory 108. A host command is stored in buffer 108 and the appropriate sequencer (i.e., 109 or 112) is initialized to execute the command.

Various DMA units (or channels, used interchangeably throughout this specification) (for example, 129, 130, 131, 132, 133 and 135) send a request to arbiter 107. When a request is granted, the DMA unit is informed of the grant and memory access is granted to a particular channel.

Arbiter 107 is coupled to a PCI-Express Transaction Handler (PTH) 137. PTH 137 is coupled to PCI-Express port logic 137B that moves information to/from a host system. PTH 137 has also been referred to as PCI-Express interface and includes a receive side and transmit side link that allows communication between the host system and adapter 106. The transmit side receives information from adapter 106 and destined for the host system and the receive side receives information from adapter 106 and destined for the host system.

ECC Protection: In one aspect of the present invention, to simplify handling of plural data path transitions, ECC protection is provided for every individual byte of data in certain components of HBA 106. After data is merged, split and aligned, the ECC protection is again converted to 64-bit blocks to improve the overall efficiency for data handling/integrity. ECC for each byte flows through byte splitting logic and re-alignment logic with each byte of data. Since data at the byte level does not change, there is no need to generate/regenerate ECC each time data is aligned/re-aligned.

Figure 2:
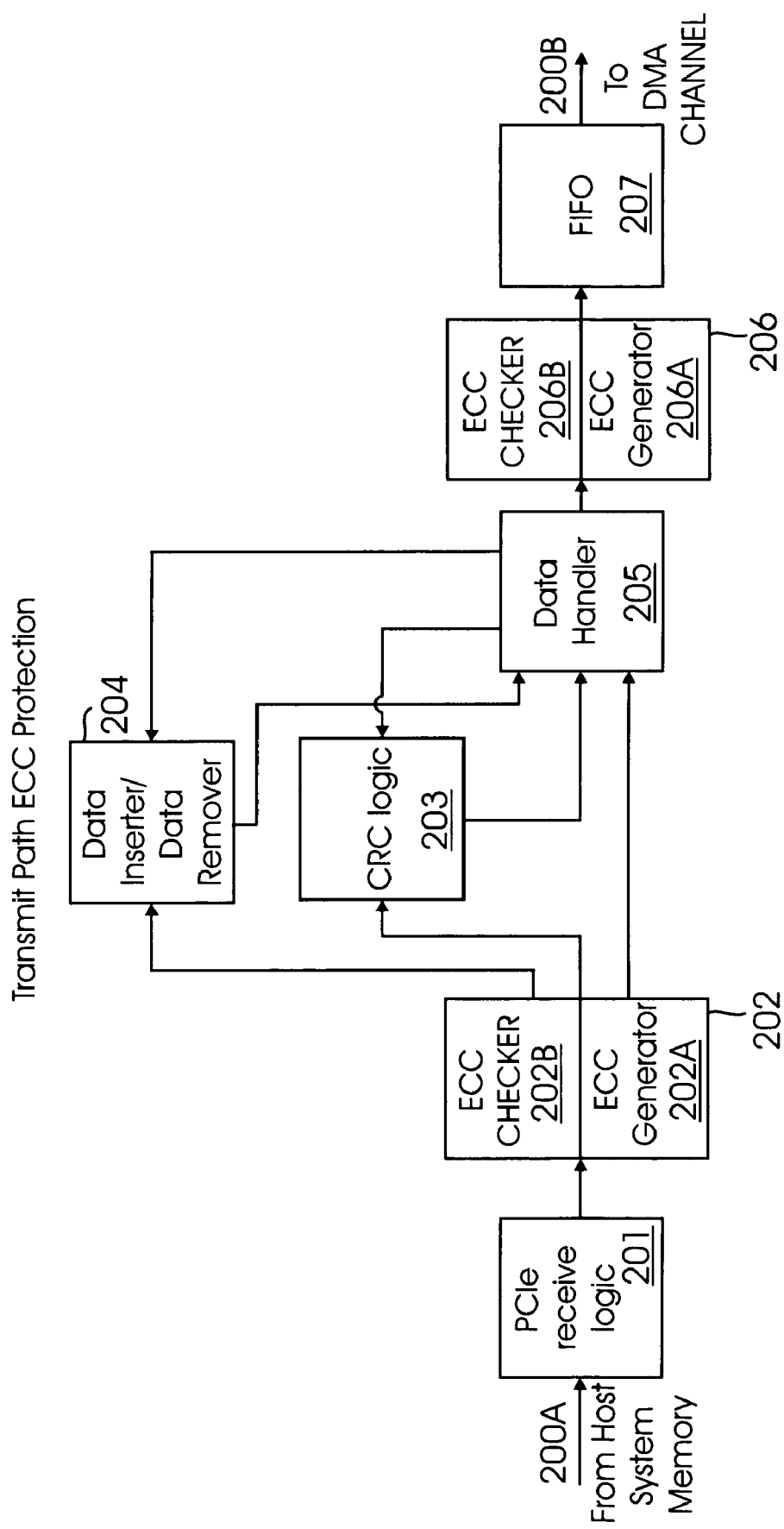
FIG. 2 shows a block diagram of a system for protecting data in the transmit path, according to one aspect of the present invention.

FIG. 2 shows a block diagram of a system 200 for protecting data along the transmit path. Data is received from host system memory based on a DMA request from a DMA module. Data 200A is received from system memory by PCI-Express logic 201 that is a part of PCI-Express Transaction handler 137. ECC module 202 includes ECC checker 202B and ECC generator 202A. ECC checker 202B checks the 7 bits of ECC data for every 32 data bits (FIG. 4), while ECC generator 202A generates 5 bits of ECC data for every byte. Once 7-bit ECC is checked and 5-bit ECC is generated, it is sent to Data Inserter/Data Removal module 204.

Module 204 pads or removes certain segments from the data whose ECC has been verified. This data is then sent to a data handler 205 that receives the data, 5-bit ECC from ECC generator 202A and CRC from CRC logic 203. Data from data handler 205 is then sent to ECC module 206, which includes ECC checker 206B and ECC generator 206A. ECC checker 206B checks 5 bits of ECC data for every byte, while ECC Generator 206A generates an 8-bit ECC for every 64 data bits. The ECC and data are then sent to a staging memory buffer 207 (shown as FIFO 207) that operates as a First-In and First-Out memory. Data 200B with ECC and CRC is then sent to the DMA channel that had requested the data from host memory.

Figure 3:
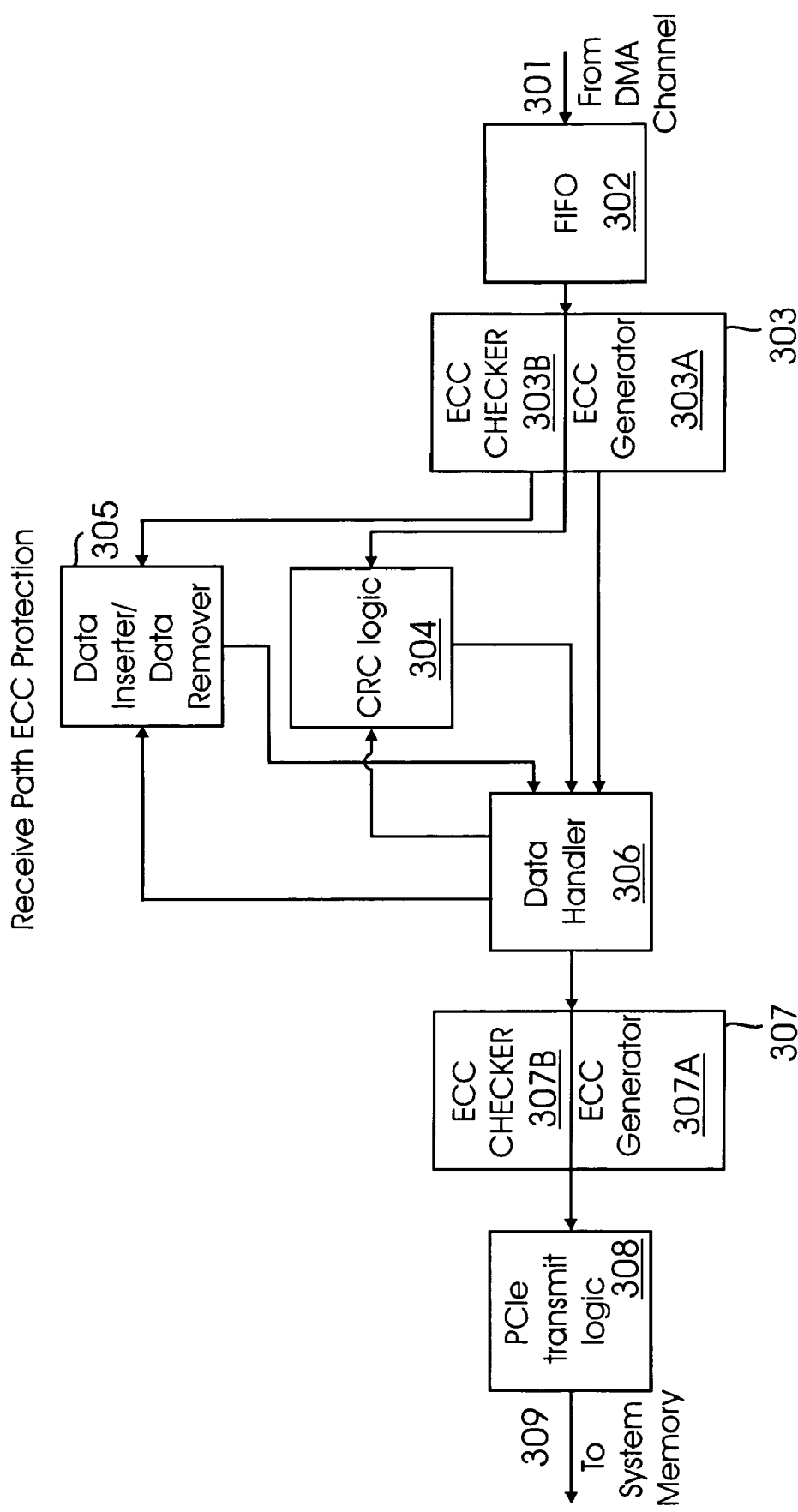
FIG. 3 shows a block diagram of a system for protecting data in the receive path, according to one aspect of the present invention.

FIG. 3 shows a block diagram of a system 300 for protecting data 301 that is received from the DMA channel and staged in FIFO 302. ECC module 303 has an ECC checker 300B and ECC generator 303A. ECC checker 303B checks the 8-bit ECC for incoming data and ECC generator 303A generates 5-bit of ECC for every byte of data. The 5-bit ECC and data are then sent to Data inserter/remover module 305 (similar to module 204 in FIG. 2). CRC logic Module 304 is similar to CRC logic module 203, while data handler module 306 is similar to data handler module 205, except they operate in the receive path.

ECC module 307 has a ECC checker 307B that verifies 5-bit ECC for every byte of data and ECC generator generates 7-bit of ECC for every 32-bit of data. Logic 308 is similar to logic 201 and data 309 (with ECC and CRC) is sent to host system memory.

Figure 4I:
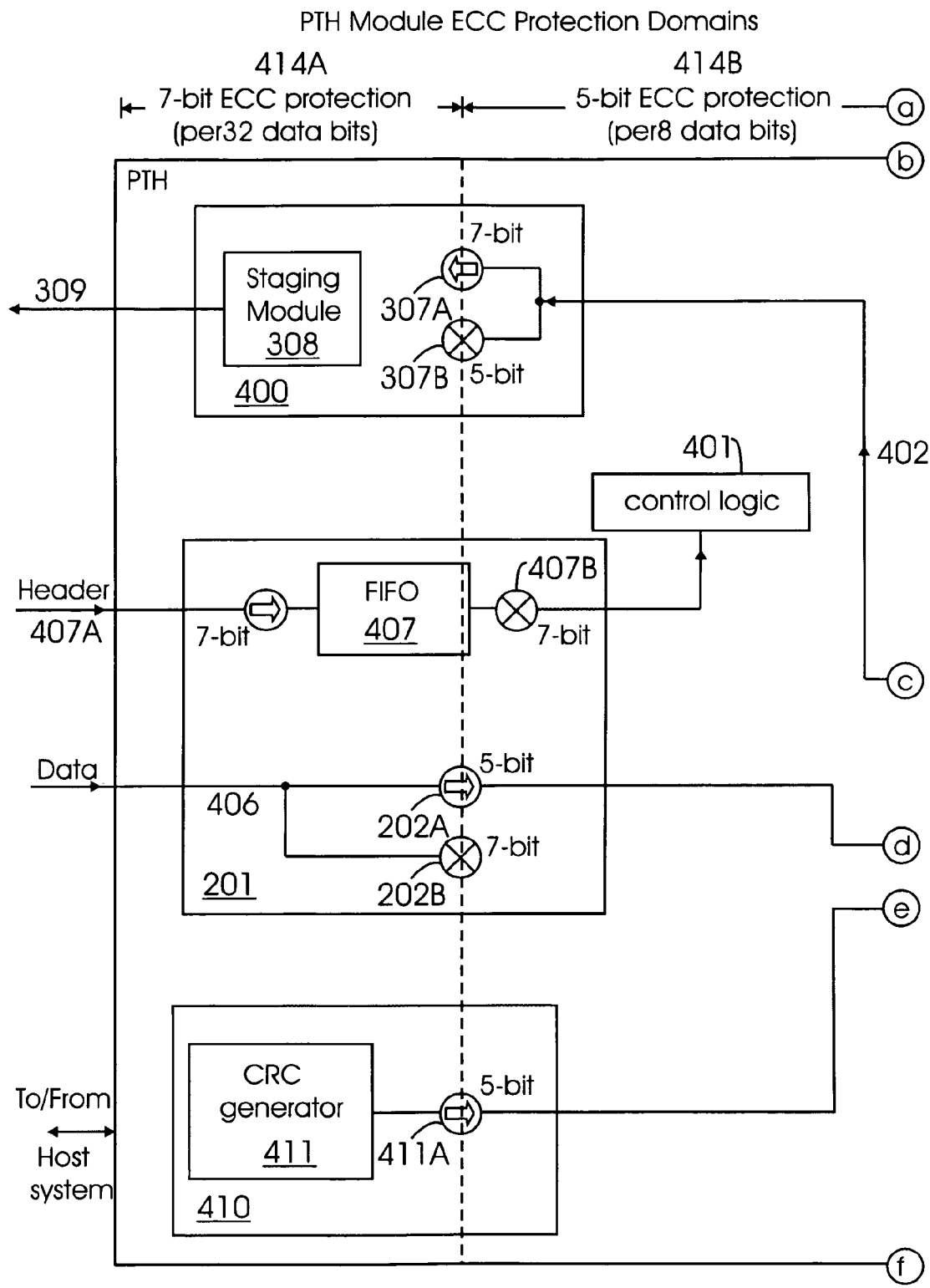
FIG. 4 shows a schematic for protecting data in the transmit/receive paths, according to one aspect of the present invention.
Figure 4:
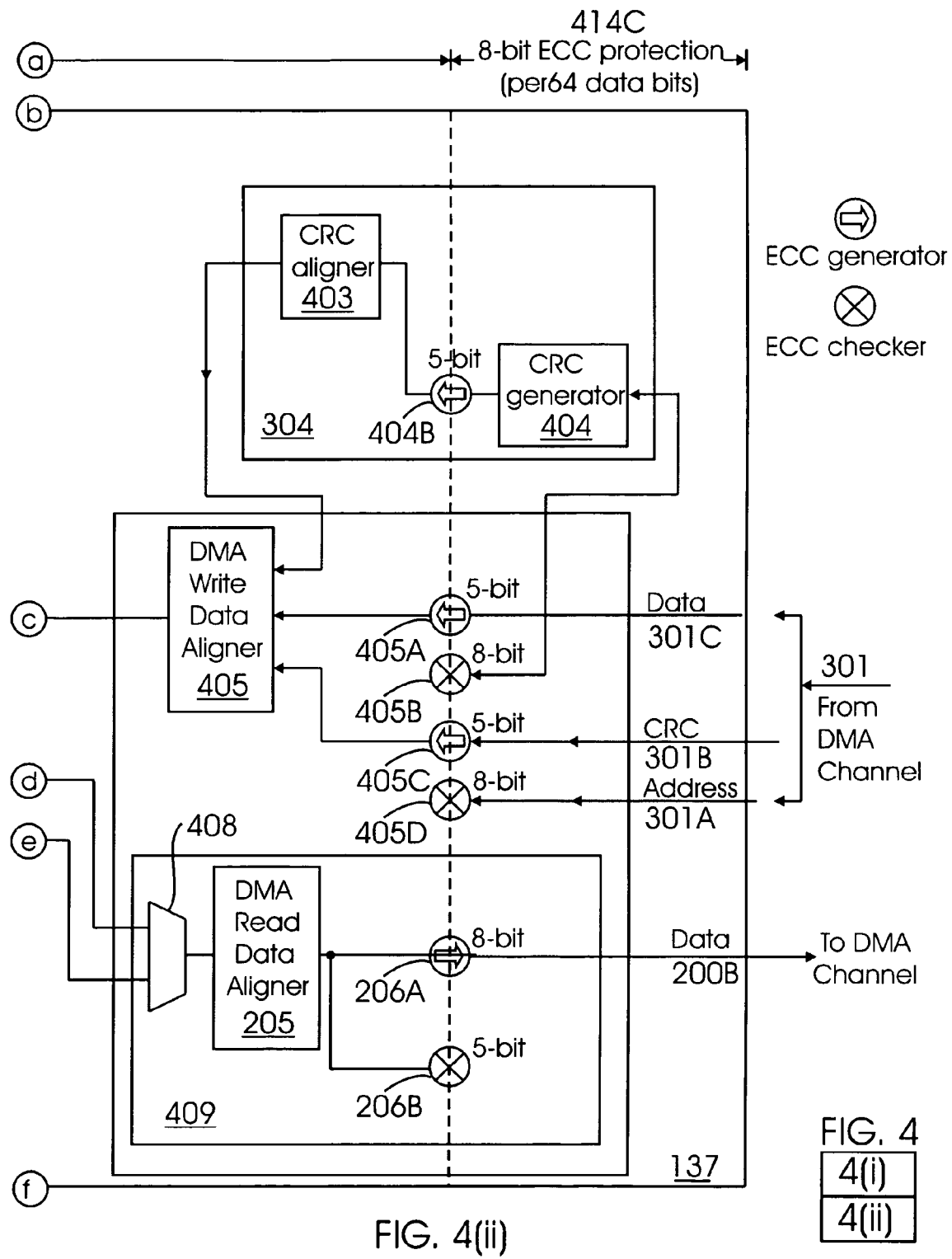

FIG. 4 shows a schematic diagram for systems 200, 300 shown in FIGS. 2 and 3. All the logic is included in PTH 137 module. All incoming data comes with 8-bits of ECC per 64 bits of data (shown as 414C), then a 5-bit ECC (shown as 414B) protects every byte of data in PTH 137 so that ECC flows with data while data is being aligned/adjusted. 7-bit ECC for every 32 data bits (shown as 414A) occurs while interfacing with the host system.

Turning in detail to FIG. 4, data 406 and header 407A (also shown as 200A, FIG. 2) is received from system memory. Header 407A is protected by 7-bit ECC and is staged in FIFO (a first-in-first out memory module) 407. Module 407B checks the 7-bit ECC code for the header and sends it to control logic 401.

Incoming data 406 is received from host system memory. Data 406 has every 32 bits protected by 7-bit ECC. The 7-bit ECC is checked by ECC checker 202B (module 202B). A 5-bit ECC is generated by ECC generator 202A (module 202A) that is then sent with the data to logic (a multiplexer ("Mux")) 408. CRC generator 411 (in CRC module 410) generates the CRC and ECC generator 411A (module 411A) generates 5-bit ECC for the CRC. The CRC with 5-bit ECC is sent to Mux 408.

Data 406, 5-bit ECC generated by ECC generator 202A and by module 411A is sent to a data read alignment module 205. Module 205 in the transmit path (i.e. for a read request) aligns data 406. Since ECC is for every byte of data, new ECC is not required after the alignment. ECC code from module 202A/411A simply moves with regular data. The 5-bit ECC from modules 202A/202B is checked by ECC checker 206B. ECC generator 206A generates 8 bit ECC for every 64-bits of data. The Data with 8-bit ECC is sent to the DMA channel that had requested the data.

Data flow in the receive path (i.e. for a write request to host system memory) is shown as 301. For clarity, incoming information 301 is shown to have three components. Address information is shown as 301A, CRC is shown as 301B and data is shown as 301C. ECC checker 405B checks 8-bit ECC that accompanies data 301C, while module 405 verifies the 8-bit ECC for address 301A.

ECC generators 405A and 405C generate 5-bit ECC for data 301B and for CRC 301C, respectively. At this stage, every byte of data is protected by 5-bit ECC. The ECC flows with the data in the receive path. Module 405 receives the incoming data with the 5-bit ECC, after the 8-bit ECC has been verified. Module 405 also receives 5-bit ECC generated by ECC generator 404B (module 404B) in CRC module 304. CRC module 304 also includes a CRC generator 404 and CRC aligner 403 for generating and aligning CRC.

Data and 5-bit ECC (shown jointly as 402) with 5-bit ECC for the CRC is sent to module 400. Module 400 includes ECC generator 307A and ECC checker 307B. ECC generator 307A generates 7-bit ECC for every 32-bits of data after ECC checker 307B has verified the 5-bit ECC for every byte of data/CRC. Data with the 7-bit ECC is then sent to a staging module 308 that stages data and ECC, before it is sent (shown as 309) to host system memory.

Figure 5:
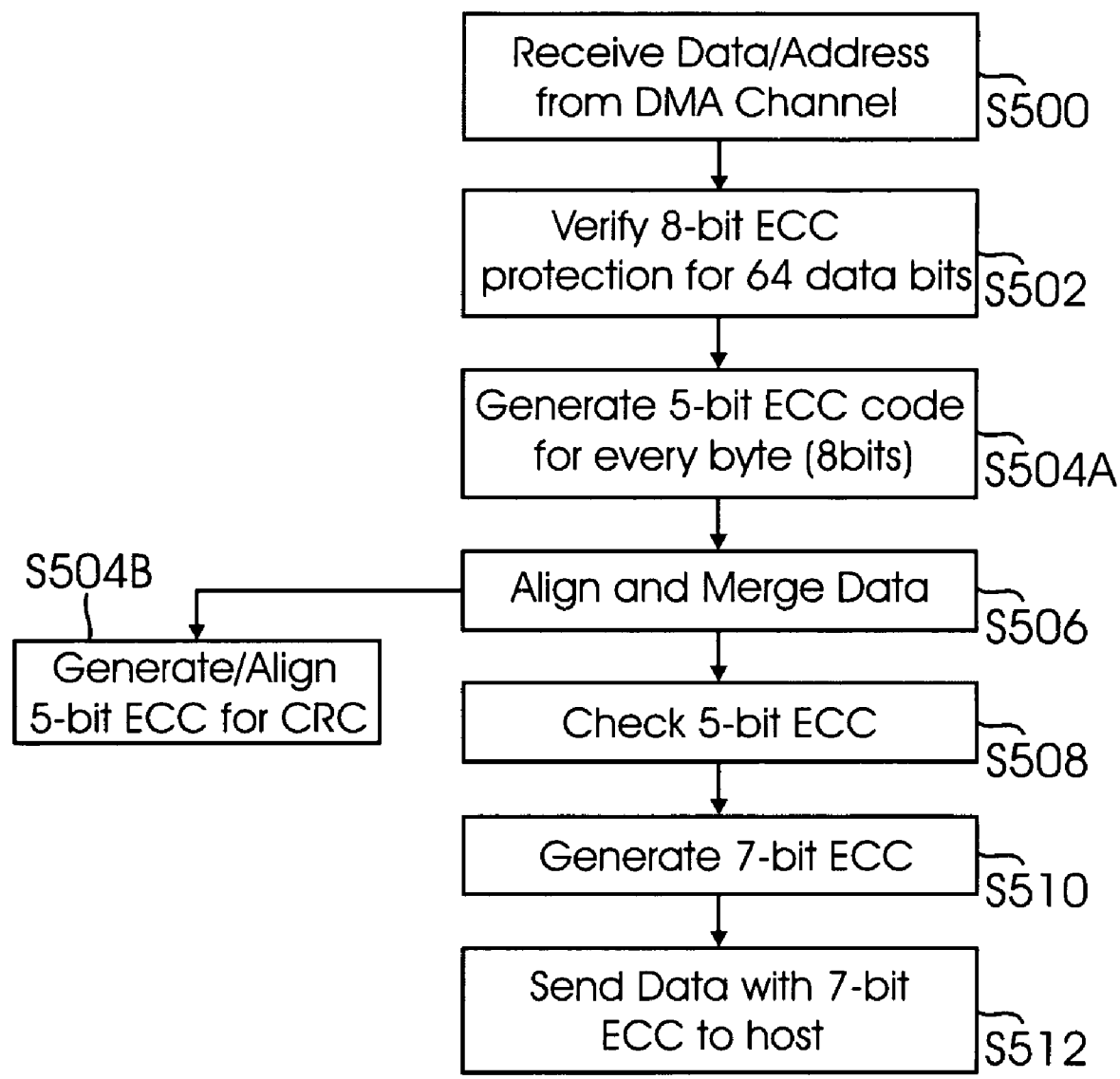
FIG. 5 shows a process flow diagram for protecting data in the receive path, according to one aspect of the present invention.

FIG. 5 shows a process flow diagram for managing data flow in the receive path, according to one aspect of the present invention. When data is received from the network, a DMA channel provides data and address in step S500. The incoming data is typically protected by 8-bit ECC for every 64-bits. In step S502, the 8-bit CRC is verified (for example, by ECC checkers 405B and 405D).

In step S504A, a 5-bit ECC is generated for every 8-bits of data. In step S504B, 5-bit ECC for every 8 bits of CRC is generated. It is noteworthy that steps S504A and S504B can occur simultaneously.

In step S506, the data (with 5-Bit ECC) is aligned (for example, by module 205). In step S508, the 5-bit ECC is checked and in step S510, 7-bit ECC for every 32-bit of data is created. In step S512, data with 7-bit ECC is sent to host system memory.

Figure 6:
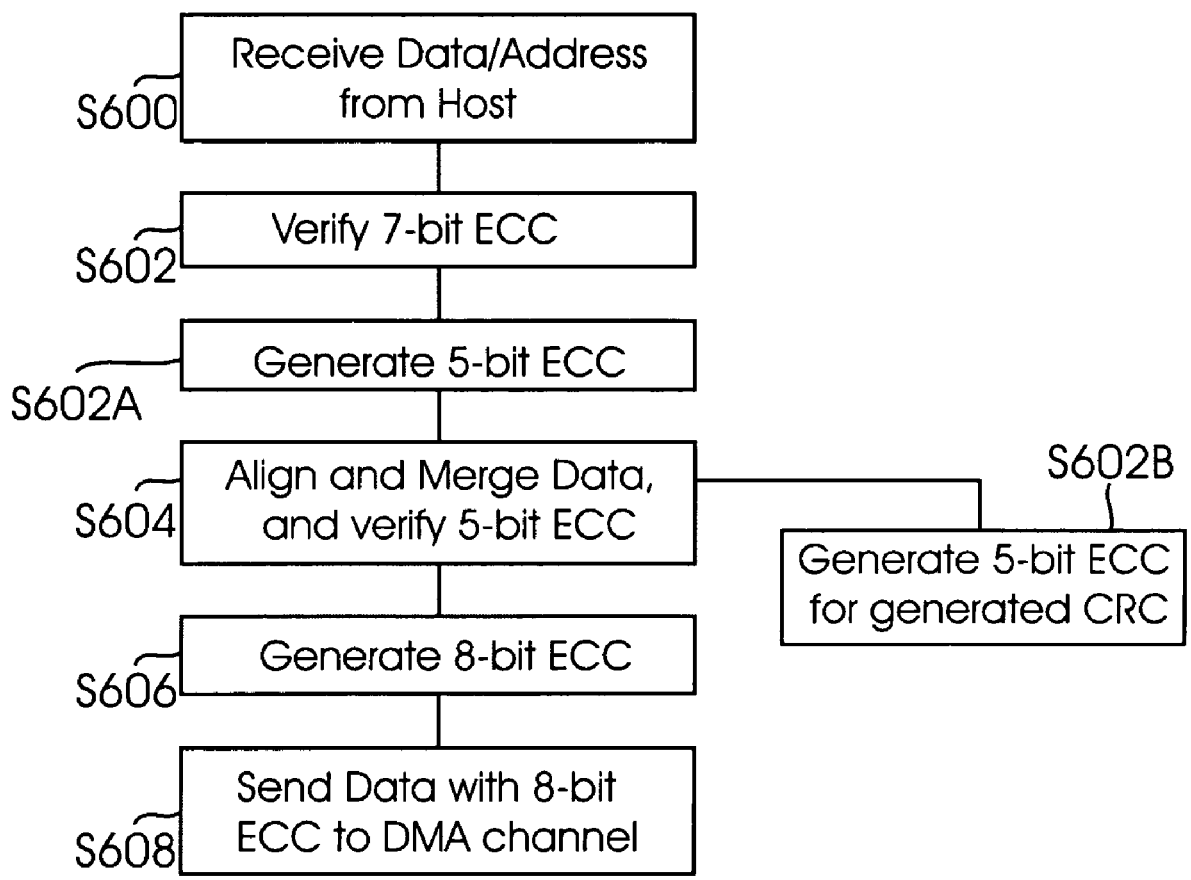
FIG. 6 shows process flow diagram for protecting data in the transmit path, according to one aspect of the present invention.

FIG. 6 shows a process flow diagram for processing data in the transmit path, according to one aspect of the present invention. The process starts in step S600, when data/address is received from host system memory. This data is protected by 7-bit ECC per 32 bits of data. In step S602, the 7-bit ECC is verified.

In step S602A, 5-bit ECC is generated for data and in step S602B, 5-bit ECC is generated for every 8-bit of CRC. It is noteworthy that steps S602A and S602B may occur simultaneously.

In step S604, data is aligned and 5-bit ECC is verified. In step S606, 8-bit ECC is generated for every 64-bits of data. Thereafter, in step S608, data with 8-bit ECC is sent to the DMA channel.

It is noteworthy that the present invention is not limited to using 5-bit, 7-bit or 8-bit ECC. Any number of bits may be used depending on processing ability of the hardware components. The present invention protects every byte of data, which allows ECC to flow with data and even after alignment/re-alignment; the same ECC can be used.

Although the present invention has been described with reference to specific embodiments, these embodiments are illustrative only and not limiting. Many other applications and embodiments of the present invention will be apparent in light of this disclosure and the following claims.

What is claimed is:

1. A method for protecting data in a PCI-Express device, comprising:
    (a) receiving data at a PCI-Express Transaction Handler ("PTH") Module for the PCI-Express device;
    (b) verifying a first error correction code ("ECC") for the received data;
    (c) before data is aligned by the PTH module, generating ECC for every byte of data that is received in step (a);
    (d) aligning the data after the ECC is generated in step (c);
    (e) without having to regenerate ECC for the aligned data, verifying the ECC generated in step (c) after the data is aligned; and
    (f) before sending the data to a destination, generating ECC code for a data block size, wherein the data block size depends on the destination of the data.

2. The method of claim 1, wherein 5-bit ECC is added for every byte of data.

3. The method of claim 1, wherein after byte level ECC is verified in the PTH module and data has been aligned, ECC is generated for every 32 data bits when data is destined for a host system memory.

4. The method of claim 3, wherein the ECC is 7-bits for every 32 data bits.

5. The method of claim 1, wherein after byte level ECC is verified in the PTH module and data has been aligned, ECC is generated for every 64 data bits when data is destined for the device.

6. The method of claim 5, wherein the ECC is 8-bits for every 64 data bits.

7. The method of claim 1, wherein the PCI Express device is a host bus adapter that is coupled to another device via a network connection and to a host system via a PCI Express bus.

8. A PCI-Express device coupled to a host system via a PCI Express bus and to a device via a network connection, comprising:
    a PCI-Express Transaction Handler ("PTH") Module that is configured to: (a) receive data; (b) verify a first error correction code ("ECC") for the received data; (c) before data is aligned by the PTH module, generate ECC for every byte of data that is received by the PTH Module; (d) align the data after the ECC is generated by the PTH Module; (e) verify the ECC generated in (c) after the data is aligned, without having to regenerate ECC for the aligned data; and (f) before sending the data, generate ECC code for a data block size; wherein the data block size depends on a destination of the data.

9. The PCI Express device of claim 8, wherein 5-bit ECC is added for every byte of data.

10. The PCI Express device of claim 8, wherein after byte level ECC is verified in the PTH module and data has been aligned, ECC is generated for every 32 data bits when data is destined for a host system memory.

11. The PCI Express device of claim 10, wherein the ECC is 7-bits for every 32 data bits.

12. The PCI Express device of claim 8, wherein after byte level ECC is verified in the PTH module and data has been aligned, ECC is generated for every 64 data bits when data is destined for the device.

13. The PCI Express device of claim 12, wherein the ECC is 8-bits for every 64 data bits.

14. The PCI Express device of claim 8, wherein the PCI Express device is a host bus adapter.

15. The method of claim 1, wherein the PCI-Express device is an adapter and data is received from a host memory and is destined for another device via the adapter.

16. The method of claim 1, wherein the PCI-Express device is an adapter and data is received from another device and destined for a host memory.

17. The PCI-Express device of claim 8, wherein data is received from a host memory and is destined for the device.

18. The PCI-Express device of claim 8, wherein data is received from the device and destined for a host memory.

19. An adapter coupled to a host system and to a device via a network connection, comprising:
    a transaction handler configured to: (a) receive data; (b) verify a first error correction code ("ECC") for the received data; (c) before data is aligned by the transaction handler, generate ECC for every byte of data that is received by the transaction handler; (d) align the data after the ECC is generated by the transaction handler; (e) verify the ECC generated in (c) after the data is aligned, without having to regenerate ECC for the aligned data; and (f) before sending the data, generate ECC code for a data block size; wherein the data block size depends on a destination of the data.

20. The adapter of claim 19, wherein data is received from a host memory and is destined for the device.

21. The adapter of claim 19, wherein data is received from the device and is destined for a host memory.

* * * * *